United States Patent [19]
Ramey

[11] 3,991,938
[45] Nov. 16, 1976

[54] COMBINATION HEAT PUMP AND LOW TEMPERATURE SOLAR HEAT ABSORBER

[76] Inventor: Harry Borders Ramey, Rte. 5, Box 272, Berea, Ky. 40403

[22] Filed: Nov. 4, 1974

[21] Appl. No.: 520,727

[52] U.S. Cl. .................................. 237/1 A; 62/2; 62/238; 237/2 B
[51] Int. Cl.² .......................................... F24J 3/02
[58] Field of Search ............... 62/324, 278, 2, 238; 237/1 A, 2 B

[56] References Cited
UNITED STATES PATENTS
2,969,637  1/1961  Rowekamp ..................... 62/2 UX Primary Examiner—William E. Wayner

[57] ABSTRACT

A combination heat pump and solar heat absorber includes an outside conduit acting as an evaporator and heat absorber in cold weather and as a condenser and heat dissipator in warm weather. The heat absorber is exposed to the sun, and a spray device enables the heat absorber to freeze a sheet of ice and further cool the ice so that ice also absorbes heat from the atmosphere and is then melted by the sun's rays. The melted material is further heated and returned to the inside of the house to the condenser of the heat pump and is heated thereby and used as a heat exchange fluid for home heating.

7 Claims, 2 Drawing Figures

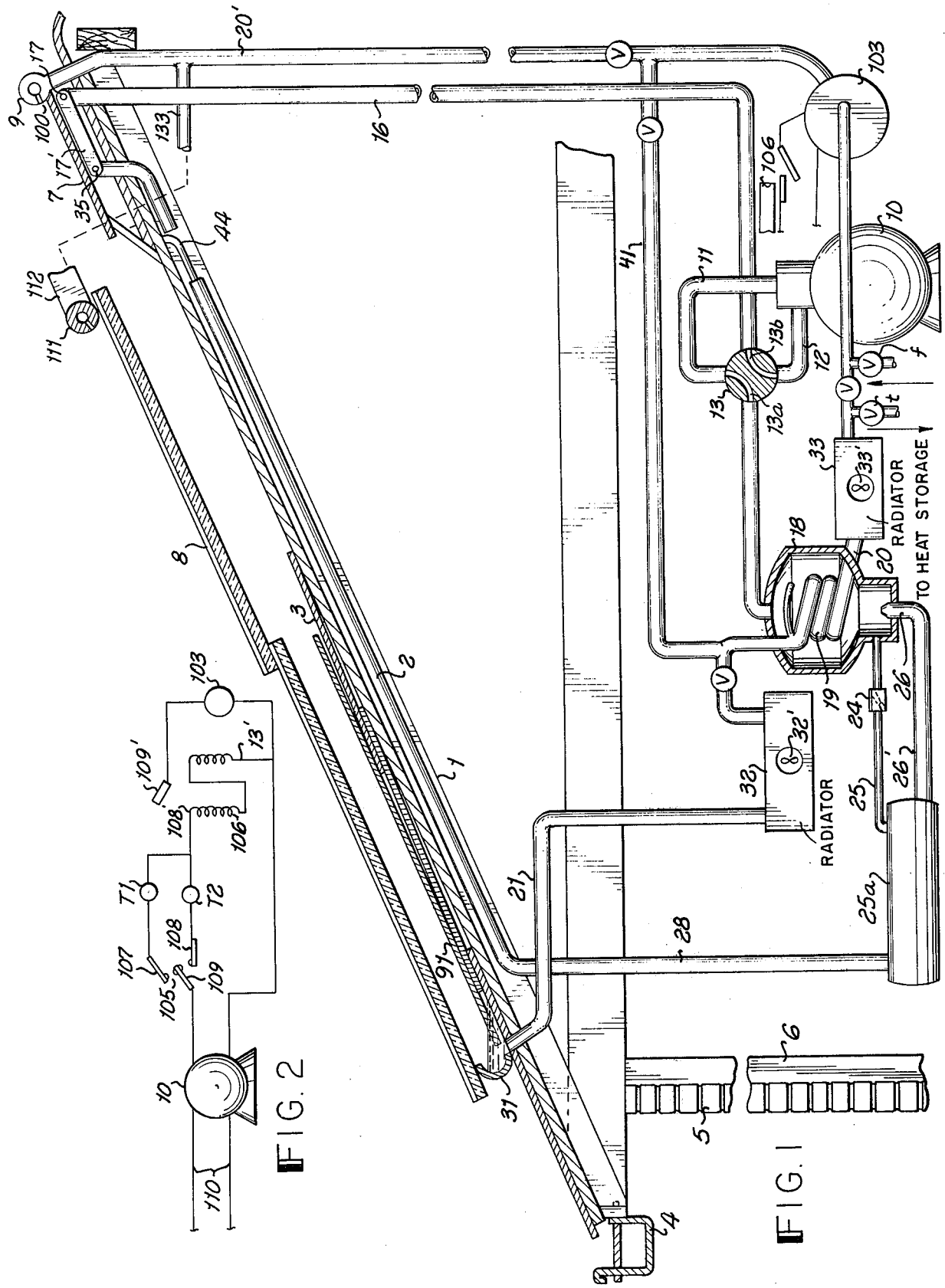

COMBINATION HEAT PUMP AND LOW TEMPERATURE SOLAR HEAT ABSORBER

BRIEF SUMMARY OF THE INVENTION

Solar heaters are not as commonly used in the United States as are Heat Pumps. Heat pumps are installed, usually, in areas where electricity is relatively cheap and fuel is expensive.

It is now well established that the solar energy reaching the roof of a house is almost sufficient to heat its interior, only a small, supplementary fuel burning device being necessary in long periods of cloudy weather.

Although large reflectors are capable of gathering enough radiant energy to heat an absorber to extremely high temperatures, the more successful home solar heaters use an absorber of large area, and the absorber remains relatively cool. The low temperature absorber loses less heat by conduction, convection and radiation.

The cold heat absorber forming an element of the present invention, rather then losing heat, picks up heat from its surroundings. When such an absorber is further exposed to radiant energy, it will not so readily lose its additional heat because it is still relatively cool.

An object of the invention is to provide a solar heat absorber which will be readily adaptable to the conventional dwelling house and which, when combined with a heat pump, will enable the heat pump to transfer more heat to the interior while using less electrical energy.

The apparatus to be described herein is adaptable to heat storage systems in which water or water and solids are used to retain heat, or the heat pump can be used independently on dark days.

The apparatus includes a heat pump having a reversing valve for the purpose of defrosting or for changing from the heating function to cooling. A solar heater on the roof of a building absorbs solar energy to heat water which is used both to heat the house interior and to assist the condensation in the condenser. The condenser heats the water in the condenser coil, and this water in turns heats radiators which, together with air circulators, transfer heat to the house interior.

FIG. 1 is a diagramatic view in section of a portion of a house in which the solar heat pump of the present invention is used.

FIG. 2 shows an electrical circuit which may be used with the present invention.

The drawing shows a house having rafters 1, sheathing, and shingles 3. The usual gutter is shown at 4. The building may have a brick wall 5 and studding 6.

The heat pump includes a compressor 10 having a high pressure line 11 and a low pressure line 12, these lines being connected to a reversing valve 13 having passageways 13a and 13b. The valve, as shown, is set for the heating cycle and allows the refrigerant fluid to enter the condenser 18 and to leave the condenser by line 28 which leads to a flow restrictor 44 and on to an evaporator tube 35 having a return line 17. Tubes 35 and 17 are soldered or welded to a plate 7 which is shown in section and which runs along the crest of the house. The plate is exposed to the ambient atmosphere and to the rays of the sun. A transparent cover shown at 8 transmits solar radiations to the shingles 3 and to the materials falling from the plate 7. A water spray tube 9 having apertures 100 emits water onto plate 7.

The water freezes losing heat to plate 7 which is cooled by tubes 35 and 17. At certain intervals the valve 13, which may be conventionally controlled, reverses, heating plate 7, and the ice on the plate then slides onto the shingles 3 to be melted by the sun's rays, and the resulting water is further heated and delivered to gutter 31 and line 21 through a house heating radiator 32 having an air circulator 32' and to condenser coils 19. The radiator reduces the temperature of the water to near room temperature and thus prepares it for its function in condenser 18 where tubes 19 aid in condensing the refrigerant and picks up heat from the condensing refrigerant fluid and delivers the heat to an additional radiator 33 having an air circulator 33'. The cooled water is then returned by pump 103 and line 20' to the spray tube 9.

During dark days the water circulator may be short circuited through line 41 and the plate 7 used to absorb heat in the manner known to those familiar with the conventional heat pump, as is the outdoor coil shown at 12 in the Alsing U.S. Pat. No. 3,009,335. In case of snow, the defrosting cycle will remove the accumulation periodically. It should be noted that the plate 7 is reduced to extremely low temperatures and absorbs heat from the surrounding air. Additionally on sunny days the plate transduces radiant energy to sensible heat. The ice and water on the roof also absorb heat recoverable in the condenser 18.

It should be noted that heat, calories, are entering the system at plates 7. All other areas of the absorber experience a net gain of heat. Only the portions of the apparatus located inside the house have a net loss of heat. In other words, energy is absorbed outside the house and released inside the house.

The heat of fusion must first be supplied to the ice before its temperature is raised, and it should be noted that this heat is recovered in condenser 18.

FIG. 2 of the drawing shows an electric supply line at 110 applying energy to compressor 10 and to water pump 103. Switch 105 includes movable members 107 and 108 and a stationary member 109. When movable member 107 of switch 105 is moved down, valve 13 is held by 13' in the position shown in FIG. 1 except for certain brief periods during which electricity is cut off by timer T-1, and electrical devices 106 and 13' become inoperative and allow pump 103 to stop and biased valve 13 to reverse.

To set the system for air conditioning during hot weather, member 109 of switch 105 is moved up, or T-1 may have a variable time cycle, and may be set to allow valve 13 to remain in the reversed position (defrost position in winter) for longer periods of time during warm weather.

Pump 103 is connected to the lower power line in FIG. 2 and to the upper line by means of contact members 108' and 109'. Solenoid 106 closes the circuit to pump 103 whenever T-1 or T-2 closes the circuit.

The following patents may be of interest;

| Hawkins | 10/21/47 |         | 2,428,876 |
|---------|----------|---------|-----------|
| Alsing  | 11/21/61 | 62-324  | 3,009,335 |
| Lowe    | 5/15/62  | 62-347XR | 3,034,310 |

The word absorber has been used in the foregoing description to designate a surface of a substance or a substance which is capable of receiving radiant heat and changing such radiant heat or electromagnetic vibrations to sensible heat.

It may be expedient at times to deliver water from line 20' via line 133 to nozzle 111 to remove unwanted materials from the transparent cover 8.

Lines t and f lead to and from a heat storage device.

Materials may be added to the water to reduce its freezing point and/or increase its heat conductivity. However, if the material added is lamp black or the like, some source of high pressure water other than line 20' should supply nozzle 111, and an additional cover 91 should be placed over shingles 3.

What is claimed is:

1. The method of heating an enclosure comprising: operating a heat pump to cool a plate exposed to the ambient atmosphere, spraying a liquid upon said plate, continuing the operation of the heat pump until a sheet of solid material is formed thereon, removing the solid material, exposing said material to radiant heat to melt it, recovering in said heat pump the heat absrobed by said material, and transferring said heat to the enclosure thereby heating said enclosure.

2. The method of claim 1 wherein the liquid contains a dark coloring material which assists in the absorption of radiant energy.

3. The combination of a heat pump and an enclosure having a boundary member arranged to receive the rays of the sun, said combination including a compressor having a high pressure line delivering a refrigerant to a condenser, a line connecting the condenser to a flow restrictor which releases the refrigerant to an evaporator tube running along a portion of the enclosure which is exposed to the sun's rays, a plate in heat conducting relation to the evaporator tube and arranged to receive the rays of the sun and transmit the resulting heat to the evaporator tube, a line returning the vaporized refrigerant to the compressor, means to distribute a liquid upon said plate, said plate arranged to deposit said liquid upon said boundary member to receive heat from the sun, means to deliver the sun heated water to said condenser to promote condensation therein, and means to conduct the water from the condenser to a space heater located inside the enclosure and back to said means to distribute liquid.

4. The combination of claim 3 and a spray tube for spraying a liquid upon the plate, the heat pump forming a means to freeze the liquid upon the plate, a means to release the ice from the plate, a boundary member of the enclosure forming a means to receive the frozen material and expose it to the sun's rays for melting, means to return the liquid to the heat pump, the heat pump forming a means to recover and release to the interior of the enclosure the heat acquired by the said plate and the said boundary member.

5. The combination of claim 3 and a coloring material added to the liquid to assist in the absorption of the sun's rays.

6. The combination of claim 4, including a transparent cover for the boundary member.

7. The combination of claim 5, including a transparent cover for the boundary member.

* * * * *